April 1, 1969            D. CRAIG            3,435,743

CAMERA SYSTEM

Filed Sept. 15, 1965            Sheet 1 of 4

INVENTOR.
DWIN CRAIG
BY
Darby & Darby
ATTORNEYS

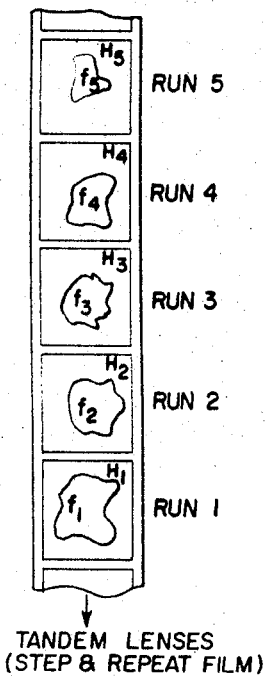
FIG. 3A
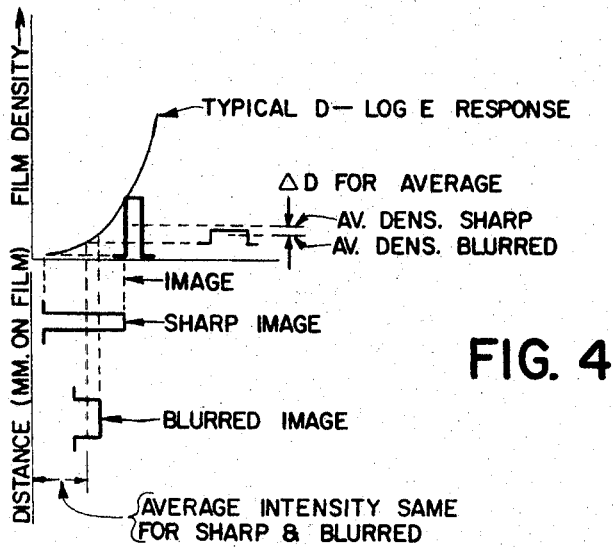
FIG. 4
FIG. 5
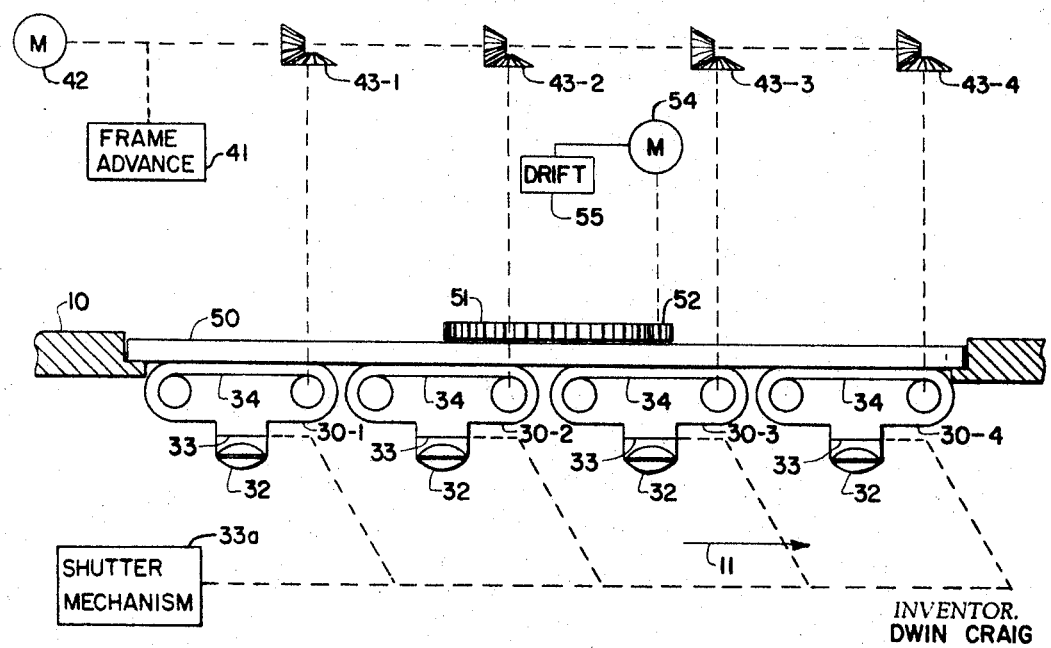

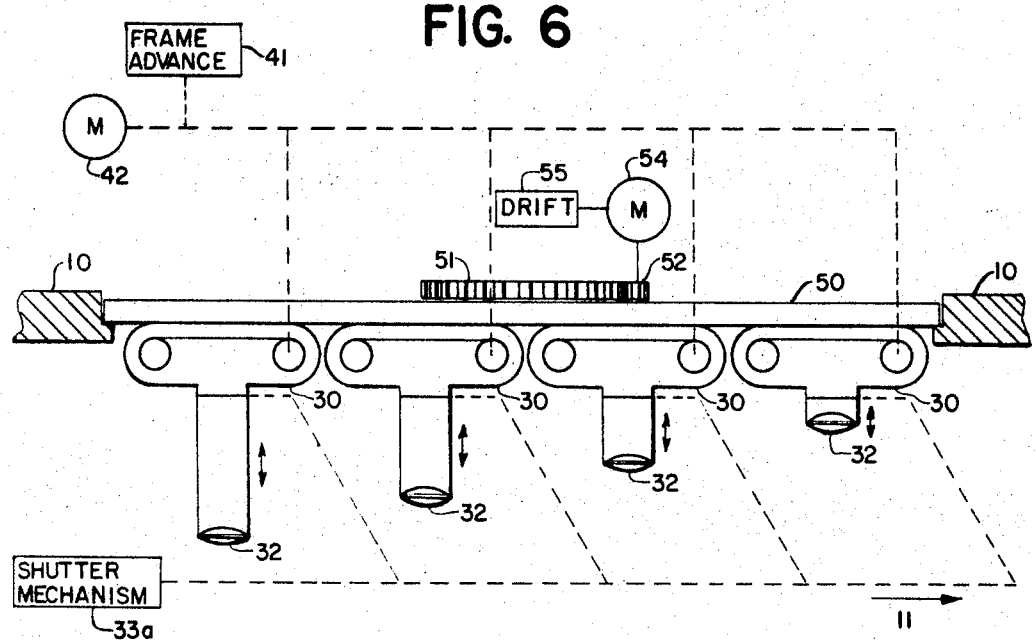
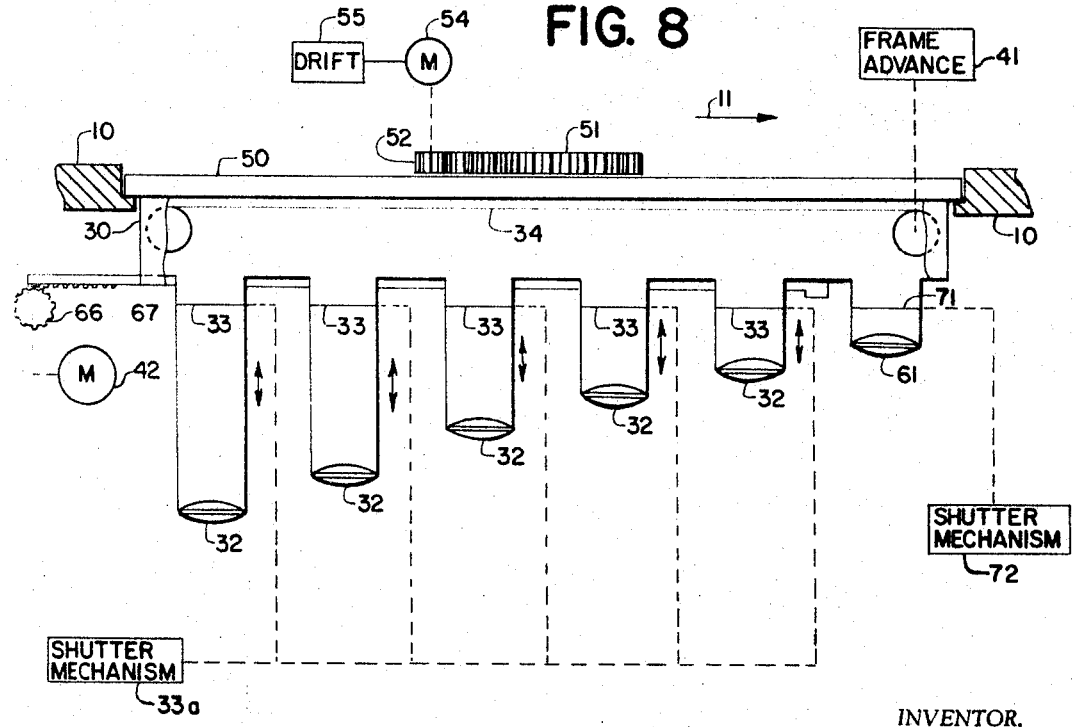

(AIRCRAFT & FILM MOVING IN SAME DIRECTION)

United States Patent Office 3,435,743
Patented Apr. 1, 1969

3,435,743
CAMERA SYSTEM
Dwin Craig, Falls Church, Va., assignor to Fairchild Hiller Corporation, Rockville, Md., a corporation of Maryland
Filed Sept. 15, 1965, Ser. No. 487,488
Int. Cl. G03b 29/00
U.S. Cl. 95—12.5       20 Claims

ABSTRACT OF THE DISCLOSURE

The aerial camera, or set of cameras, are focused at predetermined elevations, which results in the formation of contour lines of objects on the ground which are in sharp focus when at the selected elevations.

---

This invention relates to an aerial photograph camera system and method for taking aerial photographs to form contour planes at predetermined elevations by synthetically producing a large aperture.

Determining contour information from aerial photograps is generally considered to be a tedious task. In the prior art systems for producing contours, photographs of a predetermined area are taken from two observation points to form a stereophotograph pair. The photographs are taken in frames at fast exposures or in a continuous strip through a narrow slit. In both techniques, an infinite focus is used for the camera lens so that all objects photographed on the ground or above appear in focus on the film.

The stereophotographic pair is placed in a stereo viewing device from which elevation information is derived. One such device is a stereo viewing stage in which the height of the stage is proportional to contour elevation at the scale of the stereo optical photograph analog model. Manually or automatically operated stereo plotters are also used where a viewing dot is moved along an object from which elevation information is read out from the dot coordinates. Both of these techniques are relatively time consuming and, skilled photo interpreters or plotter operators are generally required to both derive the information and plot the contour.

The present invention is directed to an aerial photography method and camera system for deriving information from any desired elevation in a given area being photographed. The invention does not require the taking of stereophotographic pairs and therefore eliminates the need for stereo viewer devices and their operators. It also simplifies considerably the production of contour information, contour photograph maps, and contour maps.

In accordance with the invention an aircraft camera takes a time exposure photograph of the area of interest. The forward motion of the aircraft over the area synthetically produces a large aperture for the camera during the time exposure. This large synthetic aperture produces an object plane for the camera at one elevation having a relatively small, or sharp, depth of field. By suitably selecting the focal length of the camera lens system and/or other parameters of the system, the sharply focussed object plane can be made to occur at a predetermined vertical distance from the aircraft. Objects lying in the object plane are in focus on an image to the camera while objects above or below this plane are out of focus. Thus, the synthetic aperture system produces a photograph with objects sharply in focus on a plane at a predetermined elevation. This object plane is termed a contour plane, meaning that plane in which all objects at the particular elevation are in sharp focus.

A contour map of an object can be readily assembled by producing a number of photographs of contour planes of the object at various elevations. This can be accomplished by drawing the contour from the in focus information on each photograph and overlaying the contours. Alternatively, the various photographs of the contour planes can be overlayed or assembled by other readily performed techniques. Each contour plane is easily recognized, even by a semiskilled interpreter, merely by determining the differences in focus between the objects on a photograph.

It is therefore an object of the present invention to provide an aerial photograph method and system using a synthetically produced aperture.

A further object is to provide an aerial photographic camera system and method using a synthetic aperture for producing photographs of contour planes at predetermined elevations.

An additional object is to provide photographic camera systems and method using a synthetically produced aperture for photographing a number of contour planes from which an operator can form a contour map.

Other objects and advantages of the present invention will become more apparent upon reference to the following specification and annexed drawings in which.

Figure 3:
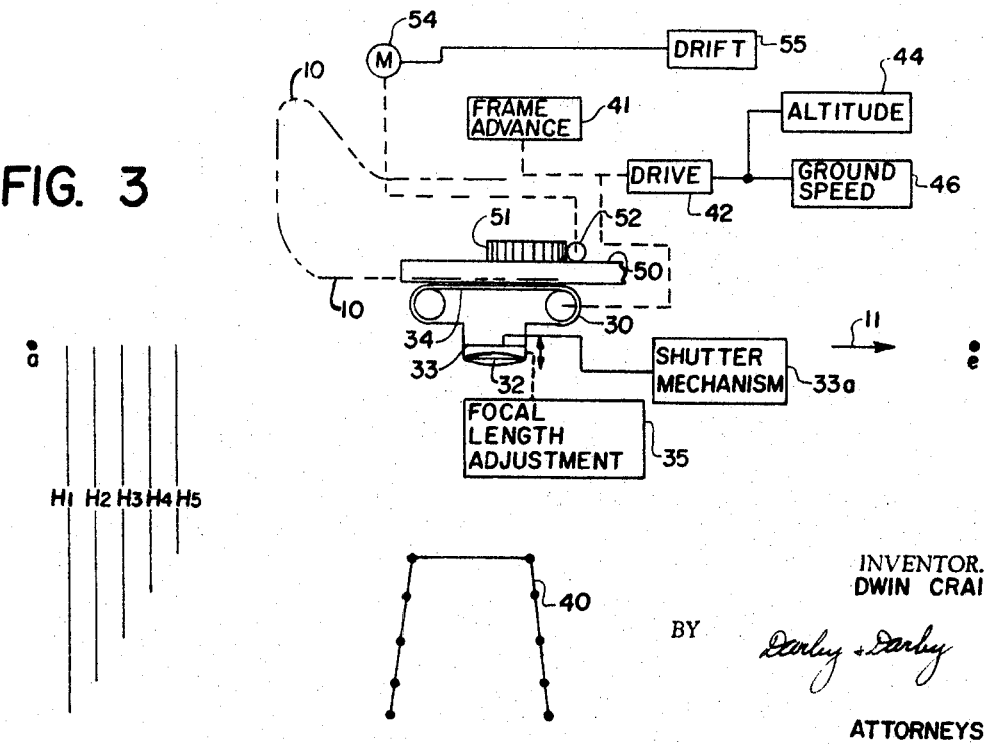
FIGURE 3 illustrates one form of camera system.
Figure 7:
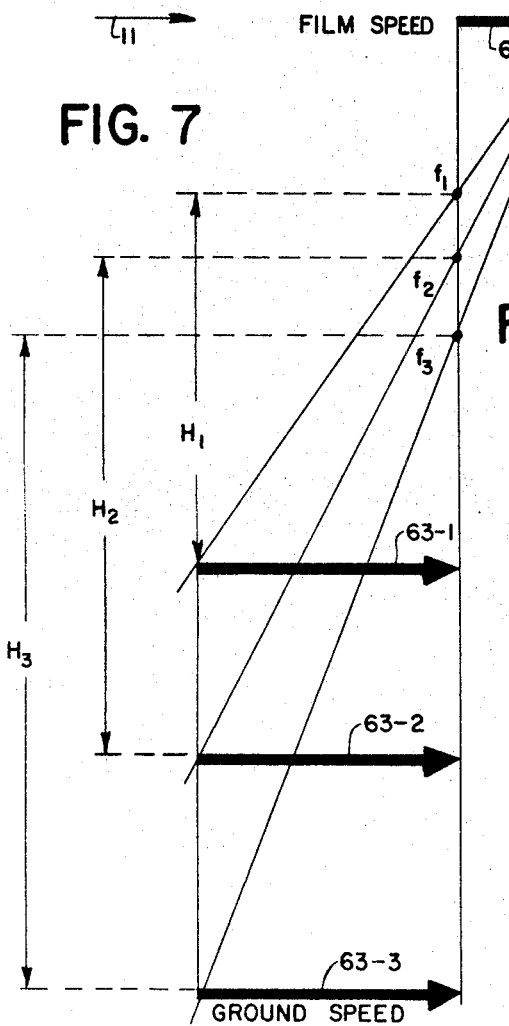
Figure 8A:
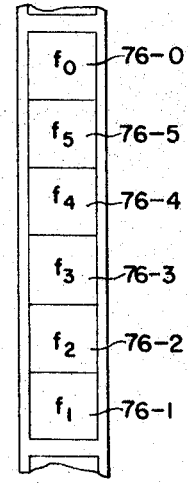
Figure 9A:
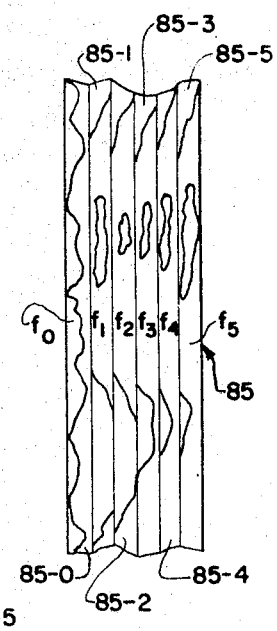
Figure 9:
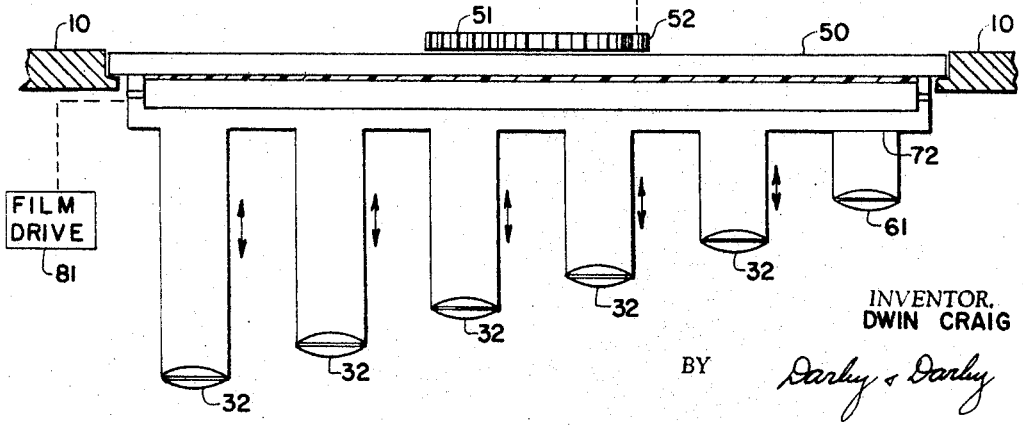

FIGURE 3A diagrammatically illustrates the photograps taken with the camera system of FIGURE 3;

FIGURE 4 is a graph illustrating how the focus discrimination is enhanced by the film emulsion;

FIGURES 5 and 6 are diagrams of various camera systems for use with the invention;

FIGURE 7 is a diagram illustrating the change in elevation of the contour planes as a function of change of focal length;

FIGURE 8 is a diagram of a multiple lens camera system;

FIGURE 8A is an illustration of the film produced with the camera system of FIGURE 8A;

FIGURE 9 is a diagram of another multiple lens camera system; and

FIGURE 9A is an illustration of the film produced wtih the camera system of FIGURE 9.

Figure 1:
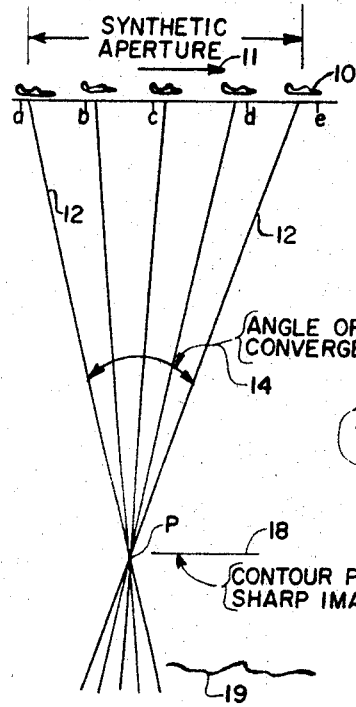
FIGURE 1 is a diagrammatic view illustrating the general operating principles of the present invention.

FIGURE 1 illustrates the general principles of the production of the synthetic aperture for the camera system of the present invention. Here, an aircraft 10 is flying in the direction indicated by arrow 11 above a point P from which light rays 12 emanate. The aircraft carries a camera (not shown) for photographing point P and all other points within its field of view. The aircraft's camera is arranged to expose the same point P on the same film, that is effectively take a "time exposure," as the aircraft flies successively from points $a$ through $e$. Since point P is imaged on the same film from points $a$ through $e$ of the forward travel of the aircraft, the camera effectively has an aperture equal to the distance between points $a$ and $e$. The angle of convergence 14 of the light rays at point P is shown as the angle between the light rays 12 incident on the aircraft's camera between points $a$ and $e$.

The aperture of the camera of FIGURE 1 is said to be formed synthetically since it depends upon the forward motion (ground speed) of the aircraft during the exposure time of the film. It should be understood that for the same exposure time an aircraft flying at a higher ground speed produces a larger synthetic aperture than one flying at a lower ground speed.

According to well known principles of optics, the depth of focus of any lens system is proportional to the so-called "$f$" number of the lens system. The "depth of focus" is generally defined as the amount the image plane can be shifted without causing the resolving power of the lens to fall below a given value. The "$f$" number is determined by the focal length of the lens and by its diameter, or the diameter of the aperture which effectively determines the lens area. The "faster" the lens, the larger is the lens diameter for a given focal length and the greater is its light gathering properties. In object space the term "depth of field" is used to define the distance between points on an object which will appear in focus on the camera film. The depth of field is inversely proportional to the effective lens aperture. Therefore, by increasing the aperture, either actually by a diaphragm or synthetically by moving the camera over a large distance, the depth of field decreases. Thus, for any fixed focal length lens, increasing the effective aperture decreases the depth of focus as well as decreasing the depth of field. Consequently, when operating a camera with a large aperture, it becomes important to focus the camera properly, that is to establish the proper distance between the lens and the object to be photographed or the lens and the film, so that the image of the object will appear in focus on the film.

In typical prior art aerial photography systems, the distance to the object is considered to be infinite as compared to the focal length of the lens. This makes the image distance equal to the focal length so that all objects beyond the focal length are "in focus." To state it another way, in prior art systems the object plane has an infinite depth and there is no elevation discrimination since all objects photographed on the ground at all elevations are "in focus." This gives rise to the need for stereophotography to acquire elevation information.

As should be clear from FIGURE 1, the aircraft 10 produces a large synthetic aperture, irrespective of the normal "$f$" number of the lens system of the camera which it carries or its physical lens aperture. Due to the "time" exposure and forward motion of the aircraft which creates the synthetic aperture the lens system of the camera has an object plane with a relatively small, or sharp, depth of field. All points on the sharply focussed object plane (contour plane), whose elevation is determined by the parameters of the lens system, distance of the lens system to the film and other camera parameters are sharply in focus on the film while all others are less sharply in focus, or blurred. Depending upon the lens system, the depth of field of the contour plane can be made only a few feet at aircraft heights of 6 to 10 miles.

As shown in FIGURE 1, the camera produces sharp images for the camera for objects on the contour plane 18, which is at an elevation H from the aircraft. Reference numeral 19 indicates the ground (base) of the terrain over which the aircraft is flying. Therefore, the distance of the contour plane above the terrain is equal to the aircraft altitude minus H.

Images on the film from objects above or below the contour plane 18 are less sharply in focus by an amount proportional to the vertical distance from the contour plane.

Figure 2:
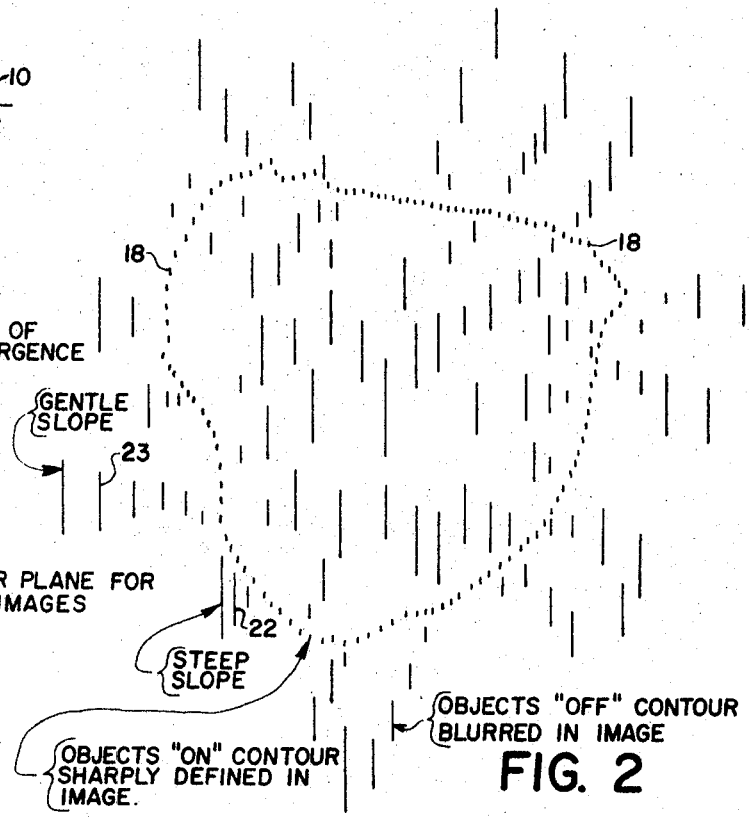
FIGURE 2 is a schematic of a photograph taken with the camera system of the present invention.

Depending upon the depth of field of the contour plane, images from objects only slightly off vertically from the contour plane appear as a "blur" on the film. This is shown in FIGURE 2, which is a schematic of an aerial photograph taken from a single lens synthetic aperture camera. Any objects on the contour plane 18 are sharply defined on the photograph, as indicated by the shortest length lines, while objects off the contour plane are blurred proportionate to the vertical distance from the contour plane, the degree of blur corresponding to the length of the lines. Thus, an area 22 off the contour plane 18 with a steep slope shows up as a blur only a short distance off the peripheray of the contour plane while a gently sloping area 23 blurs more gradually.

Using the synthetic aperture principle described in FIGURES 1 and 2, a number of contour planes of a given area can be produced for different elevations H. Stated another way, a number of contour plane "slices" of an object can be produced at different elevations from the aircraft by varying the parameters of the camera system, or other factors, so that the elevation of the contour plane is changed. The overall elevational contour of the object can be built up directly and simply from the plurality of contour planes.

There are several techniques for producing the contour planes of an object at different elevations. These may be generally summarized, in terms of equipment, as follows: (1) single camera system; (2) multicamera system; and (3) single camera, multilens system. Each of the various techniques is described below in detail.

FIGURE 3 shows a system using a single camera 30 mounted on the aircraft 10. The camera has a lens system, illustrated by the single lens 32, whose focal length is adjustable by moving the lens with respect to the plane of the film 34 by any suitable mechanism, such as the rack and pinion 35. It should be understood that any suitable lens system and mechanism for moving it may be utilized, any number of which are available in the art. The aircraft 10 flies in the direction of arrow 11 and the exposure for a frame of film is made during the time the craft flies from points $a$ to $e$. The exposure time is controlled by a shutter 33 operated manually or automatically by any conventional mechanical or electromechanical actuating means 33a.

To produce five contour planes of the object 40 at the various elevations H1 through H5, five separate runs of the aircraft have to be made from points $a$ to $e$ flying over the same path. Assuming that the runs are made at the same altitude, a focal lentgh of $f_1$ for lens system 32 produces a contour plane of elevation H1 during the first run. Successive adjustments of the focal length to $f_2$, $f_3$, $f_4$ and $f_5$ during runs two through five produces the contour planes at corresponding elevations H2 through H5. The various contour planes are shown in FIGURE 3A.

The film 34 of the camera is moved by a frame advance mechanism 41. In addition to the stepping intermittent frame motion of one frame from points $a$ to $e$, provided by mechanism 41, a drive mechanism 42, such as a motor, also produces a creeping motion of the film to provide for image motion compensation. Such mechanisms are conventional in the art and no further description thereof is necessary.

As is known in aerial photography, the ratio of the aircraft's ground speed (V) to vertical distance (H) to the object plane must be equal to the ratio of film speed to focal length to avoid image blur due to the aircraft motion. When these conditions are met, the image of each object travels across the focal plane of the camera at exactly the same rate at which the film is moved so there is no relative motion between the image and the film. This is given by the familiar formula of: film speed $$\text{(in inches per second)} = 1.467 \frac{V \text{ (miles per second)}}{H \text{ (feet)}}$$

The altitude of the aircraft above the terrain is measured by an altimeter 44, which may be either of the radio or radar type, or of the barometric type, while the ground speed is measured, for example, by a Doppler radar system 46. Since the vertical distance H of the contour plane to be taken is equal to the altitude of the aircraft minus the height of the contour plane above the terrain, it is a simple manner to compute the film speed for a contour plane at any H when the aircraft altitude is known. The film speed is set by the driven mechanism 42 either automatically or manually.

To completely compensate for image motion along a given contour, the direction of film motion must be parallel to track of the aircraft over the ground, rather than parallel to heading of the aircraft. Consequently, the camera 30 is mounted on a table or bar 50 which can rotate the camera about a vertical axis.

The table 50 is driven by a gear 51 and pinion 52, the latter being driven either manually or by a motor 54. The adjustment is made in accordance with the amount of aircraft drift measured by a conventional drift meter 55 which gives the heading error.

Each exposure taken by the synthetic aperture system of FIGURE 3 comprises an infinite number of stereo pairs. All horizontal objects possess exactly the same shape and size in each of these stereo pairs, whereas the apparent dimensions of vertical objects continually change, due to parallax. For example, the shadow of a telephone pole on the ground is repeated in shape, size and position throughout the infinite series of photographs, whereas the pole itself does not appear the same in any two consecutive photographs and hence, is blurred out of existence. In other words, the horizontal shadow correlates over the period of integration (the exposure time). As a matter of fact, the images of all objects located on the preselected contour plane demonstrate auto-correlation, whereas all other objects at all other elevation are blurred. There is no parallax problem with the horizontal objects on the contour plane since, due to the image motion compensation of the film, a horizontal object is always effectively viewed from the same point.

Imagery along the contour is characterized by a predominantly higher content of spatial frequencies than imagery not on the contour. Consequently, the contour can be further enhanced by projection in an optical system using coherent light and a spatial filter in the nodal plane of the lens.

Objects on the photographed contour plane are distinguishable as a matter of focus discrimination which can be detected by the eye. Thus, the contour outline of a contour plane can be readily drawn. Contour maps can be drawn by overlaying the different contour plane photographs of an area on a light box. An automatic system can also be used in which a photoelectric device drives a pantograph scribe.

The camera system of FIGURE 3 can also be used to produce a number of contour planes at different elevations by fixing the focal length of the lens and by moving the film at a different speed for each aircraft pass. As indicated above, the image motion compensation prevents blurring only at one predetermined elevation at a given film speed and aircraft altitude. Therefore, by changing the speed of the film creep for each pass at the same aircraft altitude the elevation at which the sharp contour plane is photographed is changed. Consequently, the various contour planes, such as shown in FIGURE 3A, can be produced. It should also be clear that both the film speed and focal length can be held fixed for each pass and the altitude of the aircraft changed.

The synthetic aperture system of the present invention can be used to make highly discriminating photographs of objects on the ground, or at some other elevation. For example, where objects such as trucks located on the ground in a heavy foliage area are to be photographed, the contour plane is set at zero feet altitude, or close thereto. Foliage above the contour plane will appear blurred on the photograph while the trucks will be sharply in focus. If desired, color filters also can be used to discriminate against the foliage.

FIGURE 4 illustrates how the inherent nonlinear response of the photographic emulsion of the film gives additional discrimination between images on the contour plane and images off the contour plane. As shown in FIGURE 4 the emulsion depth of the film has a typical exponential logarithmic response curve 50. An image 52 on the contour plane is sharply in focus and occupies relatively little area on the film. An image 53 from an object off the contour plane is blurred and occupies a larger area. As shown, both the sharp image and the blurred image have the same average intensity of light received from the object. In the development of the film, the response curve 50 inherently produces a darker spot for the developed sharp image 52a than for the developed blurred image 53a since image 52a has a greater average density. Therefore, the film response produces an inherent discrimination ΔD, the difference between the average density of the sharp image and the average density of the blurred image, upon development. This further aids in the discrimination of the contour plane.

While the camera system of FIGURE 3 operates satisfactorily to produce a plurality of contour plane photographs, it is undesirable from the point of view that an aircraft must make a number of passes over the same area. FIGURE 5 illustrates a system for forming photographs of a plurality of contour planes in a single pass of the aircraft. Similar reference numerals are used as in FIGURE 3 for the same components. Here, a number of identical cameras 30–1 through 30–4 are utilized each having a similar lens 32 of the same focal length and common synchronized shutters 33. The cameras are mounted in tandem on a rotatable table or bar 50 in a straight line. The bar 50 is shown located for rotation within the bottom of the aircraft 10 being driven by gears 51 and 52 and motor 54 to correct for aircraft drift. The direction of the aircraft travel is shown by the arrow 11.

The lens 32 of each of the cameras is shown as being fixed at the same distance from its film 34 and all the lenses have the same focal length. Here, the film creep drive motor 42 is connected to the take up reel of each camera through a respective gear set 43–1, 43–2, 43–3, and 43–4. Each of the gear sets 43–1 through 43–4 has a different ratio so that the film speed of each camera varies. As explained previously, a particular film creeping speed produces image motion compensation and a sharply focussed contour plane for only one elevation. By adjusting the creeping speed for the film of each camera, a contour plane at a different elevation can be photographed by each camera. While four cameras are shown in tandem in FIGURE 5 it should be understood that any number of cameras may be utilized.

FIGURE 6 shows an arrangement similar to FIGURE 5 for producing photographs of different contour planes at the same time. Here, each of the identical cameras 30 has a different focal length and the motor 42 drives all of the take up mechanisms at the same speed. This speed is set to provide the image motion compensation in the manner described above. As explained previously, the use of the different focal lengths produces the contour plane at a different elevation for each camera.

In multiple focal length system of FIGURE 6 a given percentage change in focal length $\Delta f/f$ produces a similar ratio of contour plane spacing interval to elevation $\Delta H/H$. This is shown in FIGURE 7. Here the speed of the film 34, as determined by the image motion compensation produced by motor 42, is indicated by the vector 62 while the group speed of the aircraft is indicated by the vector 63. ground speed of the aircraft lengths $f_1$, $f_2$ and $f_3$ are shown from the plane of the film, which is the same plane as the film speed vector. The different focal lengths produce contour planes at respective elevations H1, H2 and H3.

The ground speed with respect to any contour plane elevation is the same in a single pass multiple lens system. A line drawn from the tip of the film speed vector 62 to the tail of each ground speed vector 63 forms three similar triangles in which the following relationships apply:

$$\text{Scale} = \frac{\text{film speed}}{\text{ground speed}} = \frac{(62)}{(63)} = \frac{\text{focal length}}{\text{elevation (H)}} (f)$$

so that $$\frac{f}{H} = \frac{f_1}{H_1} = \frac{f_2}{H_2} = \frac{f_3}{H_3}$$

When $H \gg f$, which is normally the case in aerial photography, then $\Delta f/f = \Delta H/H$. Therefore, $$\text{Scale} = \frac{f}{H} = \frac{\Delta f}{\Delta H}$$

This shows that for a given percentage change in focal length, that the same percentage change occurs in contour plane spacing. For example, a one percent difference in focal length will show contour intervals at 100 feet at an elevation of 10,000 feet. At 1,000 feet elevation the same one percent change would give 10 foot contour intervals.

While the multiple camera arrangements of FIGURES 5 and 6 produce satisfactory results, the equipment required is quite substantial. FIGURE 8 shows a preferred embodiment of the invention using only a single camera 30 and multiple lenses. Here, five identical lenses 32 are shown each of which has an adjustable focal length, which is shown as being slightly different and a sixth lens 61. The lenses are mounted in tandem on a movable lens board 65 along the direction of flight of the aircraft 10. Lens board 65 is arranged to slide along the length of the camera as driven by motor 42 through the rack and pinion gearing 66. The board 65 is arranged within the light tight camera casing 67. Motor 42 provides image motion compensation for the film by moving the lens board 65. Of course, if desired, the image motion compensation can be applied to the film take up reel as in the other embodiments instead of using the film board.

Each lens 32 produces an image on the portion of the film 34 onto which its image is focused. As in the previous embodiments, drift correction is provided by motor 54 and a six frame film advance in one step by the frame advance mechanism 41. The shutters 33 for the lenses 32 are all synchronized and operated by the mechanism 33a. Lens system 61 has a separate shutter 71 operated by mechanism 72. While lenses 32 are operated to produce the synthetic aperture and the contour planes at different elevations, shutter 71 of lens 61 is operated to produce a standard aerial photograph by taking a relatively short exposure. This produces one frame on the six frame film with an infinite depth of focus which is used as a reference for coordinate information for the contour planes. No image motion compensation is normally needed for lens 61 although it could be used if desired.

FIGURE 8A shows the film 76 produced by the camera of FIGURE 8 in a single aircraft pass. Frames 76–1 through 76–5 are produced by the different focal length lens systems 32 of focal lengths $f_1$ through $f_5$, and form the contour planes at different elevations. Frame 76–0 is the standard aerial photograph produced by the lens system 61 and shutter 71. While only five contour planes on frames 76–1 through 76–5 are produceable with the camera system of FIGURE 8, it should be understood that additional frames and contour planes can be produced by adding more lens systems 32. For example, the width of film 34 can be doubled and another bank of six tandem lenses 32 placed in parallel with those shown in FIGURE 8. Also, the number of lenses in tandem can be increased.

FIGURE 9 shows another camera system in which continuous motion for film 34 is produced by a film drive motor 81. Here, the direction of travel of the aircraft is out of the paper and the film is moved at a continuous speed parallel to the direction of travel of the aircraft, for example in the same direction as the aircraft, by motor 81 driving the take up reel. A number of identical, variable focal length lens systems 32 are provided located in parallel along table 50, each imaging on a segment, or strip, of the moving film. No shutters are needed for lenses 32 nor is an intermittent film drive necessary.

Each lens 32 is adjusted to have a different focal length to photograph a contour plane at a different elevation. Lens 61 produces the standard aerial photograph by imaging the object onto film 34 through a slit aperture 72 to produce a "line by line" image on the film as the aircraft moves over the area of interest. Image motion compensation is automatically provided by the continuous motion of the film.

FIGURE 9A shows the film produced by the camera system of FIGURE 9. Strips 85–1 through 85–5 are produced by the different focal length lens 32. The line by line infinite focus photograph produced by lens 61 appears on strip 85–0.

In a typical system of the embodiments of FIGURES 3, 5, 6, 8 and 9 the lenses 32 for producing the contour plane photographs are $f/22$ with a variable focal length between 3 to 18 inches. This range of lens focal length adjustability provides excellent contour planes from altitudes of the aircraft of up to 40,000 feet or more with synthetic apertures of two miles. As explained previously, the time of exposure needed to produce a synthetic aperture, of say for example two miles, depends upon the ground speed of the aircraft.

Because of the long exposure time used, a relatively slow (small aperture) lens and slow (high resolution) film can be used. Whereas a typical standard aerial photograph system has a 0.01 second exposure time, an exposure time of 10 seconds is quite normal for the present invention. This feature permits contour photographs to be taken fairly readily at night or under other low level light conditions.

It also should be understood that all contour planes are referenced to aircraft altitude, the latter being referenced to sea level where a barometic altimeter is used. Even if an error is made in measuring barometric altitude, this has little, or no, effect on the interval between contour planes and would show only as an error in the absolute height of the contour planes above sea level and not in relative height between them. In many situations relative height is the more important of the two.

While preferred embodiments of the invention have been described above, it will be understood that these are illustrative only, and the invention is limited solely by the appended claims.

What is claimed is:

1. The method of producing an aerial photograph of a contour plane at a predetermined elevation with a camera located in a vehicle moving above the area containing the object of which the contour plane is to be formed comprising the steps of:

moving the vehicle over said area along a predetermined path for a predetermined time, and taking a time exposure of the area on the camera film with image motion compensation during said predetermined time, the movement of the vehicle and the time exposure creating a large synthetic aperture for the camera to thereby produce an object plane with a sharp depth of field at a certain elevation, this object plane corresponding to the contour plane.

2. The method of producing an aerial photograph of a contour plane at a predetermined elevation with a camera located in a vehicle moving above the area containing the object of which the contour plane is to be formed comprising the steps of:

moving the vehicle over said area along a predetermined path for a predetermined time, taking a time exposure of the area on the camera film with image motion compensation during said predetermined time, the movement of the vehicle and the time exposure creating a large synthetic aperture for the camera to thereby produce an object plane with a sharp depth of field at a certain elevation, this object plane corresponding to the contour plane, and selecting the elevation at which said object plane with sharp field occurs.

3. The method as set forth in claim 2 wherein the step of selecting the contour plane elevation comprises varying the focal length of the camera lens system.

4. The method as set forth in claim 2 wherein the step of selecting the contour plane elevation comprises moving the film at a predetermined speed.

5. The method as set forth in claim 2 wherein the step of selecting the contour plane elevation comprises moving the vehicle along said predetermined path at a predetermined altitude for a given film speed and lens focal length.

6. The method of producing a plurality of aerial photographs of contour planes at predetermined elevations with a camera system located in a vehicle moving above the area containing the object of which the contour planes are to be taken comprising the steps of:

moving the vehicle a predetermined number of times over said area along a predetermined path, taking a time exposure on the film for said predetermined time during each time the vehicle moves along said predetermined path, the movement of the vehicle and the time exposure creating a large synthetic aperture for the camera to thereby produce an object plane with a sharp depth of field at a certain elevation, and selecting the elevation at which said object plane occurs during each time the vehicle moves along said path to produce the contour plane at a desired elevation.

7. The method of producing a plurality of aerial photographs of contour planes at predetermined elevations with a camera system located in a vehicle moving above the area containing the object of which the contour planes are to be taken comprising the steps of:

moving the vehicle over said area along a predetermined path, simultaneously taking a time exposure on a number of segments of film for a predetermined time as said vehicle moves along said predetermined path, the movement of said vehicle and the time exposure creating a large synthetic aperture to thereby produce an object plane with a sharp depth of field for each segment of film, and selecting the elevation at which said sharply focused object plane occurs for each segment of film, each said object plane corresponding to a contour plane.

8. The method as set forth in claim 7 wherein the step of selecting the contour plane elevation for each segment of film comprises varying the focal length of a lens system associated with each said segment.

9. The method as set forth in claim 7 wherein the step of selecting the contour plane elevation for each segment of film comprises moving each said film segment at a predetermined speed.

10. A camera system for a moving vehicle for producing aerial photographs of a plurality of contour planes of an object at predetermined elevations comprising:

film for the camera system, a plurality of lens means, each of said lens means producing an image on a predetermined portion of the film, means for operating said camera system to establish for the lens means an object plane at at least two different predetermined elevations, and means for taking an exposure of the same area of interest within the field of view of each lens means for a predetermined time interval during which the vehicle moves over said area of interest along a predetermined line of flight, the movement of the vehicle and the time exposure producing an object plane for each lens means having a relatively sharp depth of field at a respective predetermined elevation, each said object plane defining a said contour plane.

11. A camera system as set forth in claim 10 wherein each said lens means has a corresponding separate film portion and said camera system operating means comprises means for moving each of said portions of said film at a predetermined speed to select the elevation of a corresponding contour plane.

12. A camera system as set forth in claim 10 wherein each said lens means has a different focal length to establish an object plane at a respective elevation.

13. A camera system as set forth in claim 12 wherein means are provided to move all of said film portions at the same speed to provide image motion compensation.

14. A camera system as set forth in claim 12 wherein means are provided to move all of said film portions continuously at substantially the same speed and generally in the same direction as the direction in which said vehicle is moving and said plurality of lens means are located with respect to said film to produce side by side continuous film strips.

15. A camera system as set forth in claim 12 wherein each said lens means has a shutter means to produce the timed exposure, and means to actuate all of said shutter means in common.

16. A camera system as set forth in claim 13 wherein said lens means are located generally along the path of movement of the aircraft and said film also lies generally along the same path.

17. A camera system as in claim 10 wherein all of said film portions are part of a single piece of film.

18. A camera system as in claim 17 wherein the plurality of lens means are disposed generally transverse to the direction of flight of the vehicle, and means are provided to move said single piece of film continuously in the direction of flight.

19. A camera system for a moving vehicle for simultaneously producing aerial photographs of a plurality of contour planes of an object at predetermined different elevations comprising:

film for the camera system;

a plurality of first means for producing an image of the object on a predetermined portion of the film, means for operating said camera system to establish simultaneously on the film an image plane for each of said first means corresponding to an object plane at a respective predetermined elevation, and means for taking an exposure of the same area of interest within the field of view of said first means for a predetermined time interval during which the vehicle moves over said area of interest along a predetermined line of flight and creates a relatively large synthetic aperture, the movement of the vehicle and the time exposure producing the synthetic aperture causing the object plane for each of said first means to have a relatively sharp depth of field at a respective predetermined elevation, each said object plane defining a said contour plane.

20. A camera system as in claim 19 wherein said first means are disposed generally transverse to the line of flight.

References Cited

UNITED STATES PATENTS

| | | | |
|---|---|---|---|
| 2,309,627 | 2/1943 | Cooke | 35—14 |
| 2,424,989 | 8/1947 | Koepfer | 95—12.5 |
| 2,556,798 | 6/1951 | Concordet | 35—41 |
| 2,685,238 | 8/1954 | Baker | 95—12.5 |
| 3,007,383 | 11/1961 | Heftye | 95—12.5 |
| 1,950,166 | 3/1934 | Durholz | 95—45 |
| 2,713,814 | 7/1955 | Sonne | 95—12.5 |
| 2,972,928 | 2/1961 | Maurer | 95—12.5 X |
| 3,158,079 | 11/1964 | Willits | 95—12.5 |

JOHN M. HORAN, *Primary Examiner.*

UNITED STATES PATENT OFFICE
CERTIFICATE OF CORRECTION

Patent No. 3,435,743                       April 1, 1969

Dwin Craig

It is certified that error appears in the above identified patent and that said Letters Patent are hereby corrected as shown below:

Column 3, line 72, "peripheray" should read -- periphery --
Column 6, line 56, "group" should read -- ground --; line 57, "ground speed of the aircraft" should read -- Three exemplary focal --.

Signed and sealed this 19th day of May 1970.

(SEAL)
Attest:

Edward M. Fletcher, Jr.
Attesting Officer

WILLIAM E. SCHUYLER, J
Commissioner of Paten